(12) United States Patent
Heatley et al.

(10) Patent No.: US 10,038,734 B2
(45) Date of Patent: Jul. 31, 2018

(54) TELECOMMUNICATION NETWORK MANAGER

(71) Applicant: STARLEAF LTD, London (GB)

(72) Inventors: Richard Piers Heatley, Cambridge (GB); Samuel Thomas Jansen, Newmarket (GB); Nicholas Ian Moss, Middlesex (GB)

(73) Assignee: STARLEAF LTD., London (GB)

( * ) Notice: Subject to any disclaimer, the term of this patent is extended or adjusted under 35 U.S.C. 154(b) by 129 days.

(21) Appl. No.: 14/831,783

(22) Filed: Aug. 20, 2015

(65) Prior Publication Data

US 2016/0080454 A1 Mar. 17, 2016

(30) Foreign Application Priority Data

Aug. 20, 2014 (GB) .................................. 1414840.7

(51) Int. Cl.
*H04L 1/18* (2006.01)
*H04L 29/06* (2006.01)
*H04L 1/00* (2006.01)
*H04L 12/24* (2006.01)
(Continued)

(52) U.S. Cl.
CPC ............ *H04L 65/607* (2013.01); *G06F 11/10* (2013.01); *H04L 1/0002* (2013.01); *H04L 1/0009* (2013.01); *H04L 41/0896* (2013.01); *H04L 43/08* (2013.01); *H04L 41/147* (2013.01); *H04L 43/0829* (2013.01); *H04L 43/0894* (2013.01)

(58) Field of Classification Search
CPC ..... H04L 65/607; H04L 43/08; H04L 1/0002; H04L 1/0009; H04L 41/0896; H04L 41/147; H04L 43/0894; H04L 43/0829; G06F 11/10
See application file for complete search history.

(56) References Cited

U.S. PATENT DOCUMENTS

| | | | |
|---|---|---|---|
| 8,036,151 B2 * | 10/2011 | Das | H04L 1/0002 370/248 |
| 8,959,203 B1 * | 2/2015 | Miller | H04L 47/00 709/223 |
| 2006/0256810 A1 | 11/2006 | Yarlagadda et al. | |

(Continued)

FOREIGN PATENT DOCUMENTS

EP 0905948 A2 3/1999

OTHER PUBLICATIONS

Extended European Search Report for European Application No. 16156871.2 dated May 30, 2016 (in 9 pages).

(Continued)

*Primary Examiner* — Thien Nguyen
(74) *Attorney, Agent, or Firm* — Knobbe, Martens, Olson & Bear, LLP

(57) ABSTRACT

In some embodiments, a telecommunication network manager can receive input regarding quality information for a plurality of data paths among a plurality of endpoint devices. The telecommunication network manager can receive statistical information from these endpoints and make decisions on bandwidth optimization for a group of calls sharing the same infrastructure. The telecommunication network manager can recommend rate changes on other endpoints using the same network infrastructure to mitigate against packet loss for a more important data path.

22 Claims, 3 Drawing Sheets

(51) Int. Cl.
*G06F 11/10* (2006.01)
*H04L 12/26* (2006.01)

(56) References Cited

U.S. PATENT DOCUMENTS

| | | | |
|---|---|---|---|
| 2010/0104025 A1* | 4/2010 | Rose | H04N 21/234 |
| | | | 375/240.27 |
| 2013/0159495 A1* | 6/2013 | Wang | H04N 19/146 |
| | | | 709/224 |
| 2014/0105036 A1* | 4/2014 | Anschutz | H04L 41/5019 |
| | | | 370/252 |
| 2016/0028992 A1 | 1/2016 | Heatley et al. | |

OTHER PUBLICATIONS

Combined Search and Examination Report for European Application No. GB1414840.7 dated Jan. 30, 2015 in 6 pages.

* cited by examiner

TELECOMMUNICATION NETWORK MANAGER

FIELD OF THE INVENTION

The present invention relates to a telecommunication network and, in particular, a telecommunication end point device and a telecommunication network manager forming part of the telecommunication network.

BACKGROUND OF THE INVENTION

Media devices or telecommunication end point devices such as telephones and videophones that work across networks require some mechanism whereby they can efficiently share the network infrastructure with other network devices taking into consideration the requirements of media streams between the media devices and how they differ from those of ordinary data such as from computers in normal use. Media streams, particularly for videophone calls, require consistent high bandwidth on the shared network between end point devices to be acceptable. This is because current compressed media streams are vulnerable to lost packets because information in the current packet often makes reference to information which should have been received in a previous packet. So, if that previous packet is not delivered, then a decoder of the receiving end point device must somehow recover from the situation either by requesting retransmission of the lost information or filling in with made-up information. In either case, the user of the end point device will observe a discontinuity of video or audio which is not desirable. In contrast, ordinary data from computers, such as from internet surfing, e-mailing and file upload and download has variations in bandwidth requirements depending on the task being carried out, and it can be acceptable to have varying bandwidth availability on the shared network.

FIG. 1 illustrates such a known shared network 10. It includes a media device 2, in this example, a video phone, connected to the Internet 1 via a bandwidth-constrained link 4 controlled by a router 6. A computer, in this example, in the form of a personal computer (PC) or desktop computer 5 is also connected to the Internet 1 via the same bandwidth-constrained link 4 controlled by the same router 6. There are another two media devices also, in this example, video phones 3 and 8 connected to the Internet 1 via another bandwidth-constrained link 9 controlled by another router 12. One of the media devices 2 sends media to one of the other media devices 3, but the competing device on the network, the PC 5, also attempts to send information to the Internet over the same bandwidth constrained link 4 as the media device 2 and at the same time. Under these circumstances, some compromise must be reached whereby the importance of the various data streams from the media device 2 and the PC 5 will determine the proportion of bandwidth that should be dedicated to them on the bandwidth-constrained link 4.

In known arrangements, media devices 2,3,8 currently have a "self-centred" view of bandwidth. They will typically start transmitting at a particular bit rate as if they are the only device on the network 10 using a bandwidth-constrained link 4,12 and will "back off" or reduce their bit rate as they experience the effects of competition for resources by detecting dropped packets. This initial loss of packets gives a user of the media device a frustrating and unsatisfactory first impression either through call set-up delays or broken first images until the bit rate has settled down to a workable rate.

SUMMARY OF THE INVENTION

Embodiments of the present invention described herein address the problems of the prior art described above by providing a system for centrally managing media stream bitrates within a wide-area network of channels of varying bandwidth. The example system centrally manages multiple devices with multiple media stream bitrates within channels of varying bandwidth.

The telecommunication network manager of embodiments of the present invention monitors quality and adapts bandwidth on multiple channels between multiple endsystems over complex networks comprising many links to which the telecommunication network manager has no direct access. The telecommunication network manager of embodiments of the present invention performs this monitoring periodically and repeatedly over the lifetime of the channels.

The telecommunication network manager of embodiments of the present invention considers the historical quality and bandwidth availability of a communication channel or data path to make a best guess at data path setup time. The telecommunication network manager of embodiments of the present invention also continues to monitor quality and adapt the link bandwidth periodically and repeatedly over the lifetime of the connection. The telecommunication network manager of embodiments of the present invention also discovers the path through the telecommunication network (generally, the Internet) that the channel is taking, and makes deductions about how the channel may interact with other channels sharing links on that path.

The telecommunication network manager of embodiments of the present invention receives information from more than two endsystems containing quality information of channels established between any of those endsystems. It receives this information repeatedly for the lifetime of those channels and can send instructions to the endsystems to change the encoding parameters used on a channel at any time during a channel's lifetime.

Embodiments of the present invention described herein include a method and system which enable voice and videotelephony devices to predict workable initial bandwidths, cooperate over shared resources, and prepare for predicted network degradation.

In the example system, a large number of telephone or video-telephone devices connected to a network such as the Internet comprising bandwidth-constrained connections efficiently use the available bandwidth which is shared with other unrelated devices competing for that bandwidth.

The invention in its various aspects is defined in the independent claims below to which reference should now be made. Advantageous features are set forth in the dependent claims.

Arrangements are described in more detail below and take the form of a telecommunication network comprising: a telecommunication network manager for managing the telecommunication network comprising a plurality of data paths for media streams between telecommunication end point devices. The telecommunication network manager comprises an input to input information regarding at least: a data path along which a media stream travels for telecommunication on the telecommunication network, and the media stream; and an output to output to each of a plurality of end point devices using the data path an indication of bit rate to use on the data path and at least one of forward error correction rate to use on the data path and an indication of predicted packet loss rate along the data path. The telecommunication network manager also comprises a processor configured to process the information from the input and to output from the output to each of the plurality of end point devices using the data path an indication of bit rate and at least one of an indication of forward error correction rate to use on the data path based on the information and an indication of predicted packet loss rate along the data path based on the information. The telecommunication end point devices each comprise an input to input at least one of the indication of bit rate and forward error correction rate to use for a media stream along the data path on the telecommunication network and an indication of predicted packet loss rate along the data path from the telecommunication network manager; and an output to output a media stream along the data path at the indicated bit rate and forward error correction rate or based on the indication of predicted packet loss rate along the data path.

In an aspect of the present invention, there is provided a telecommunication network manager comprising: an input to input information regarding at least: a data path along which a media stream travels for telecommunication on a telecommunication network, and the media stream; an output to output to each of a plurality of end point devices using the data path an indication of bit rate to use on the data path; and a processor configured to process the information from the input and to output from the output to each of the plurality of end point devices using the data path an indication of bit rate to use on the data path based on the information. The information regarding the media stream may include an indication of quality of the data paths along which the media streams travel. The information regarding the media stream may include one or more of: current transmit bit rate from at least one of the end point devices, received bit rate at at least one of the end point devices, packet loss rate along the data path, packet loss characteristics along the data path, latency along the data path, a decline indication indicating that at least one of the end point devices has declined to implement a bit rate as indicated by the telecommunication network manager, a failure indication indicating that at least one of the end point devices has failed to implement a bit rate as indicated by the telecommunication network manager.

The output may further output to each of the plurality of end point devices using the data path at least one of an indication of forward error correction rate to use on the data path and an indication of predicted packet loss rate along the data path; and the processor is further configured to process the information from the input and to output from the output to each of the plurality of end point devices using the data path the indication of forward error correction rate to use on the data path and the indication of predicted packet loss rate along the data path.

The information regarding the media stream may include one or more of: a decline indication indicating that at least one of the end point devices has declined to implement a forward error correction rate as indicated by the telecommunication network manager, a failure indication indicating that at least one of the end point devices has failed to implement a forward error correction rate as indicated by the telecommunication network manager.

The telecommunication network manager may further comprising a store configured to store data comprising the indications of bit rate and forward error correction rate output to each of the plurality of end point devices using the data path to use on the data path based on the information.

The telecommunication network manager may further comprise a store configured to store data comprising at least some of the information.

The processor may be configured to additionally process the data stored in the or each store at initial media stream set-up on the data path.

Information regarding the media stream may be input at different times from different end point devices using the data path.

The information regarding the data path may include one or more of: Internet Protocol addresses of each of the end point devices, and Internet Protocol addresses of intermediate relay systems intermediate the end point devices.

In an aspect of the present invention, there is provided a telecommunication end point device for telecommunication on a telecommunication network, the telecommunication end point device comprising: an input to input an indication of bit rate to use for a media stream along a data path on a telecommunication network; and an output to output a media stream along the data path at the indicated bit rate.

At least one of an indication of predicted packet loss rate and forward error correction rate to use for a media stream along a data path on a telecommunication network may be input at the input.

The media stream may be output at the output with a bit rate at the input indicated bit rate and a forward error correction rate at the input forward error correction rate.

The telecommunication end point device may further comprise a processor to process the input indication of predicted packet loss rate along the data path to calculate a forward error correction rate for the media stream along the data path.

The media stream may be output at the output with a bit rate at the input indicated bit rate and a forward error correction rate at the calculated forward error correction rate.

The output may be further configured to output at least one of: an indication of current transmit bit rate from the output, an indication of received bit rate at the input, an indication of received packet loss rate, an indication of packet loss characteristics, an indication of data path latency, a decline indication indicating that the end point device declines to implement the indicated bit rate, and a failure indication indicating that the end point device has failed to implement the indicated bit rate.

The output is further configured to output at least one of: a decline indication indicating that the end point device declines to implement the indicated forward error correction rate, and a failure indication indicating that the end point device has failed to implement the indicated forward error correction rate.

The telecommunication end point device may be configured to periodically and/or on input of an appropriate signal at the input from a telecommunication manager output at least one of: the indication of current transmit bit rate from the output, an indication of received bit rate at the input, an indication of received packet loss rate, an indication of packet loss characteristics, an indication of data path latency, a decline indication indicating that the end point devices decline to implement the indicated bit rate, and a failure indication indicating that the end point device has failed to implement the indicated bit rate.

The telecommunication end point device may be configured to periodically and/or on input of an appropriate signal at the input from a telecommunication manager output at least one of: a decline indication indicating that the end point device declines to implement the indicated forward error correction rate, and a failure indication indicating that the end point device has failed to implement the indicated forward error correction rate.

The telecommunication end point device may be configured to store at least one of packet loss rate along the data path and latency along the data path.

The telecommunication end point device may be configured to output an indication of sudden change in at least one of: packet loss rate along the data path if the packet loss rate changes by a predetermined amount over a predetermined time period; latency along the data path if the latency changes by a predetermined amount over a predetermined time period.

The input may be further configured for input of a media stream.

The telecommunication end point device may further comprise a processor to calculate at least one of packet loss rate and latency of the input media stream.

The telecommunication end point device may be further configured to output a media stream along the data path at a bit rate and forward error correction rate based on at least one of the calculated packet loss rate and latency of the input media stream.

In another aspect of the present invention, there is provided a telecommunication network comprising: a telecommunication network manager for managing the telecommunication network comprising a plurality of data paths for media streams between telecommunication end point devices; the telecommunication network manager comprising: an input to input information regarding at least: a data path along which a media stream travels for telecommunication on a telecommunication network, and the media stream; an output to output to each of a plurality of end point devices using the data path an indication of bit rate to use on the data path; and a processor configured to process the information from the input and to output from the output to each of the plurality of end point devices using the data path an indication of bit rate to use on the data path based on the information; and the telecommunication end point devices each comprising: an input to input an indication of bit rate to use for a media stream along a data path on a telecommunication network; and an output to output a media stream along the data path at the indicated bit rate.

The output of the telecommunication network manager may further output to at least one of the plurality of end point devices using the data path at least one of an indication of forward error correction rate to use on the data path and an indication of predicted packet loss rate along the data path; and the processor is further configured to process the information from the input of the telecommunication network manager and to output from the output of the telecommunication network manager to at least one of the plurality of end point devices using the data path the indication of forward error correction rate to use on the data path and the indication of predicted packet loss rate along the data path.

The telecommunication network manager may further comprise a store configured to store data comprising the indications of bit rate and forward error correction rate output to at least one of the plurality of end point devices using the data path to use on the data path based on the information.

The telecommunication network manager may further comprise a store configured to store data comprising at least some of the information.

The processor of the telecommunication network manager may be further configured to additionally process the data stored in the or each store at initial media stream set-up on the data path.

Information regarding the media stream may be input at different times from different end point devices using the data path.

At least one of an indication of predicted packet loss rate and forward error correction rate to use for a media stream along a data path on a telecommunication network may be input at the input of at least one of the telecommunication end point devices.

The media stream may be output at the output of at least one of the telecommunication end point devices with a bit rate at the input indicated bit rate and a forward error correction rate at the input forward error correction rate.

At least one of the telecommunication end point devices may further comprise a processor to process the input indication of predicted packet loss rate along the data path to calculate a forward error correction rate for the media stream along the data path.

The media stream may be output at the output of at least one of the telecommunication end point devices with a bit rate at the input indicated bit rate and a forward error correction rate at the calculated forward error correction rate.

The information regarding the data path may include one or more of: Internet Protocol addresses of each of the end point devices, and Internet Protocol addresses of intermediate relay systems intermediate the end point devices. That is, the information regarding data paths may include information regarding the route of a data path. The information regarding the media stream may include one or more of: current transmit bit rate from at least one of the end point devices, received bit rate at at least one of the end point devices, packet loss rate along the data path, packet loss characteristics along the data path, latency along the data path, a decline indication indicating that at least one of the end point devices has declined to implement a bit rate as indicated by the telecommunication network manager, a failure indication indicating that at least one of the end point devices has failed to implement a bit rate as indicated by the telecommunication network manager.

The information regarding the media stream may include one or more of: a decline indication indicating that at least one of the end point devices has declined to implement forward error correction rate as indicated by the telecommunication network manager, a failure indication indicating that at least one of the end point devices has failed to implement forward error correction rate as indicated by the telecommunication network manager.

The output of at least one of the telecommunication end point devices may be configured to output at least one of: an indication of current transmit bit rate from the output, an indication of received bit rate at the input, an indication of received packet loss rate, an indication of packet loss characteristics, an indication of data path latency, a decline indication indicating that the end point device declines to implement the indicated bit rate, and a failure indication indicating that the end point device has failed to implement the indicated bit rate.

The output of at least one of the telecommunication end point devices may be configured to output at least one of: a decline indication indicating that the end point device declines to implement the indicated forward error correction rate, and a failure indication indicating that the end point device has failed to implement the indicated forward error correction rate.

At least one of the telecommunication end point devices may be further configured to periodically and/or on input of an appropriate signal at the input from a telecommunication manager output at least one of: the indication of current transmit bit rate from the output, an indication of received bit rate at the input, an indication of received packet loss rate, an indication of packet loss characteristics, an indication of data path latency, a decline indication indicating that the end point device declines to implement the indicated bit rate, and a failure indication indicating that the end point device has failed to implement the indicated bit rate.

At least one of the telecommunication end point devices may be further configured to periodically and/or on input of an appropriate signal at the input from a telecommunication manager output at least one of: a decline indication indicating that the end point device declines to implement the indicated forward error correction rate, and a failure indication indicating that the end point device has failed to implement the indicated forward error correction rate.

At least one of the telecommunication end point devices may be configured to store at least one of packet loss rate and latency along the data path.

At least one of the telecommunication end point devices may be configured to output an indication of sudden change in at least one of: packet loss rate along the data path if the packet loss rate changes by a predetermined amount over a predetermined time period; latency along the data path if the latency changes by a predetermined amount over a predetermined time period.

In another aspect of the present invention, there is a method of managing a telecommunication network comprising: processing information regarding at least: a data path along which a media stream travels for telecommunication on the telecommunication network, and the media stream; and outputting to each of a plurality of end point devices using the data path an indication of bit rate to use on the data path based on the information.

The method of managing a telecommunication network according may further comprise: outputting to each of the plurality of end point devices using the data path at least one of an indication of forward error correction rate to use on the data path and an indication of predicted packet loss rate along the data path based on the information.

The method of managing a telecommunication network may further comprise storing data comprising at least some of the information and the indications of bit rate and forward error correction rate output to each of the plurality of end point devices using the data path to use on the data path based on the information.

The method of managing a telecommunication network may further comprise additionally processing the data stored in the store at initial media stream set-up on the data path.

The method of managing a telecommunication network may further comprise inputting the information regarding the media stream at different times from different end point devices using the data path.

The information regarding the data path may include one or more of: Internet Protocol addresses of each of the end point devices, and Internet Protocol addresses of intermediate relay systems intermediate the end point devices.

The information regarding the media stream may include one or more of: current transmit bit rate from at least one of the end point devices, received bit rate at at least one of the end point devices, packet loss rate along the data path, packet loss characteristics along the data path, latency along the data path, a decline indication indicating that at least one of the end point devices has declined to implement a bit rate as indicated by the telecommunication network manager, a failure indication indicating that at least one of the end point devices has failed to implement a bit rate as indicated by the telecommunication network manager.

The information regarding the media stream may include one or more of: a decline indication indicating that at least one of the end point devices has declined to implement a forward error correct rate as indicated by the telecommunication network manager, a failure indication indicating that at least one of the end point devices has failed to implement a forward error correction rate as indicated by the telecommunication network manager.

In another aspect of the present invention, there is provided a method of telecommunicating from a telecommunication end point device on a telecommunication network, the method comprising: inputting into a telecommunication end point device an indication of bit rate to use for a media stream along a data path on a telecommunication network; and outputting from the end point device a media stream along the data path at the indicated bit rate.

The method of telecommunicating from a telecommunication end point device on a telecommunication network may further comprise inputting into the end point device at least one of: an indication of forward error correction rate to use for a media stream along a data path on a telecommunication network and an indication of predicted packet loss rate along the data path; and outputting from the end point device a media stream along the data path at the indicated bit rate and forward error correction rate or based on the indication of predicted packet loss.

The method of telecommunicating from a telecommunication end point device on a telecommunication network may further comprise outputting at least one of: an indication of current transmit bit rate from the output, an indication of received bit rate at the input, an indication of received packet loss rate, an indication of packet loss characteristics, an indication of data path latency, a decline indication indicating that the end point device declines to implement the indicated bit rate, and a failure indication indicating that the end point device has failed to implement the indicated bit rate.

The method of telecommunicating from a telecommunication end point device on a telecommunication network may further comprise outputting at least one of: a decline indication indicating that the end point device declines to implement the indicated forward error correction rate, and a failure indication indicating that the end point device has failed to implement the indicated forward error correction rate.

The method of telecommunicating from a telecommunication end point device on a telecommunication network may further comprise the telecommunication end point device periodically and/or on input of an appropriate signal at the input from a telecommunication manager outputting at least one of: the indication of current transmit bit rate from the output, an indication of received bit rate at the input, an indication of received packet loss rate, an indication of packet loss characteristics, an indication of data path latency, a decline indication indicating that the end point device declines to implement the indicated bit rate and/or forward error correction rate, and a failure indication indicating that the end point device has failed to implement the indicated bit rate and/or forward error correction rate.

The method of telecommunicating from a telecommunication end point device on a telecommunication network further comprising the telecommunication end point device periodically and/or on input of an appropriate signal at the input from a telecommunication manager outputting at least one of: a decline indication indicating that the end point device declines to implement the indicated forward error correction rate, and a failure indication indicating that the end point device has failed to implement the indicated forward error correction rate.

The method of telecommunicating from a telecommunication end point device on a telecommunication network may further comprise the end point device storing at least one of packet loss rate along the data path and latency along the data path.

The method of telecommunicating from a telecommunication end point device on a telecommunication network may further comprise the telecommunication end point outputting an indication of sudden change in at least one of: packet loss rate along the data path if the packet loss rate changes by a predetermined amount over a predetermined time period; latency along the data path if the latency changes by a predetermined amount over a predetermined time period.

The method of telecommunicating from a telecommunication end point device on a telecommunication network may further comprise processing the input indication of predicted packet loss rate along the data path to calculate a bit rate and forward error correction rate for a media stream along the data path and outputting from the output a media stream along the data path at the calculated bit rate and forward error correction rate.

In another aspect of the present invention, there is provided a telecommunication method implemented on a telecommunication network comprising a plurality of data paths for media streams between telecommunication end point devices, the method comprising: inputting into a telecommunication network manager information regarding at least: a data path along which a media stream travels for telecommunication on the telecommunication network, and the media stream; the telecommunication manager processing the information and as a result of the processing outputting to each of a plurality of end point devices using the data path an indication of bit rate to use on the data path; inputting into each end point device, from the telecommunication network manager, the indication of bit rate to use for a media stream along the data path on the telecommunication network; and each end point device outputting a media stream along the data path at the indicated bit rate along the data path.

The telecommunication method may further comprise the telecommunication manager further processing the information and as a result of the processing outputting to each of a plurality of end point devices using the data path at least one of an indication of forward error correction rate to use on the data path based on the information and an indication of predicted packet loss rate along the data path based on the information; inputting into each end point device, from the telecommunication network manager, the indication of forward error correction rate to use on the data path based on the information and/or the indication of predicted packet loss rate along the data path based on the information; and each end point device outputting a media stream along the data path at the indicated bit rate and at the input indicated forward error correction rate or at a forward error correction rate based on the indication of predicted packet loss rate along the data path.

The information regarding the data path may include one or more of: Internet Protocol addresses of each of the end point devices, and Internet Protocol addresses of intermediate relay systems intermediate the end point devices.

The information regarding the media stream may include one or more of: current transmit bit rate from at least one of the end point devices, received bit rate at at least one of the end point devices, packet loss rate along the data path, packet loss characteristics along the data path, latency along the data path, a decline indication indicating that at least one of the end point devices has declined to implement a bit rate as indicated by the telecommunication network manager, a failure indication indicating that at least one of the end point devices has failed to implement a bit rate as indicated by the telecommunication network manager.

The information regarding the media stream may include one or more of: a decline indication indicating that at least one of the end point devices has declined to implement a forward error correction rate as indicated by the telecommunication network manager, a failure indication indicating that at least one of the end point devices has failed to implement a forward error correction rate as indicated by the telecommunication network manager.

The telecommunication method may further comprise the telecommunication network manager storing data comprising at least some of the information and the indications of bit rate output to each of the plurality of end point devices using the data path to use on the data path based on the information.

The telecommunication method may further comprise the telecommunication network manager storing data comprising at least some of the information and the indications of forward error correction rate output to each of the plurality of end point devices using the data path to use on the data path based on the information.

The telecommunication method may further comprise the telecommunication network manager processing the stored data at initial media stream set-up on the data path.

The telecommunication method may further comprise inputting information regarding the media stream at different times from different end point devices using the data path.

The telecommunication method may further comprise at least one of the telecommunication end point devices outputting at least one of: an indication of current transmit bit rate from the output, an indication of received bit rate at the input, an indication of received packet loss rate, an indication of packet loss characteristics, an indication of data path latency, a decline indication indicating that at least one of the end point devices declines to implement the indicated bit rate, and a failure indication indicating that at least one of the end point devices has failed to implement the indicated bit rate.

The telecommunication method may further comprise at least one of the telecommunication end point devices outputting at least one of: a decline indication indicating that the end point device declines to implement the indicated forward error correction rate, and a failure indication indicating that the end point device has failed to implement the indicated forward error correction rate.

The telecommunication method may further comprise at least one of the telecommunication end point devices periodically and/or on input of an appropriate signal at the input from a telecommunication manager outputting at least one of: the indication of current transmit bit rate from the output, an indication of received bit rate at the input, an indication of received packet loss rate, an indication of packet loss characteristics, an indication of data path latency, a decline indication indicating that the end point devices declines to implement the indicated bit rate, and a failure indication indicating that the end point device has failed to implement the indicated bit rate.

The telecommunication method may further comprise at least one of the telecommunication end point devices periodically and/or on input of an appropriate signal at the input from a telecommunication manager outputting at least one of: a decline indication indicating that the end point device declines to implement the indicated forward error correction rate, and a failure indication indicating that the end point device has failed to implement the indicated forward error correction rate.

The telecommunication method may further comprise at least one of the telecommunication end point devices storing at least one of packet loss rate along the data path and latency along the data path.

The telecommunication method may further comprise at least one of the telecommunication end point devices outputting an indication of sudden change in at least one of: packet loss rate along the data path if the packet loss rate changes by a predetermined amount over a predetermined time period; latency along the data path if the latency changes by a predetermined amount over a predetermined time period.

The telecommunication method may further comprise at least one of the end point devices processing the input indication of predicted packet loss rate along the data path to calculate a bit rate and forward error correction rate for a media stream along the data path and outputting from the output a media stream along the data path at the calculated bit rate and forward error correction rate.

A computer program may be configured to carry out the method described above.

A computer-readable medium may contain a set of instructions that causes a computer to perform the method as described above. The computer-readable medium may be, for example, a hard disk drive, a solid state memory device, a CD-ROM or a DVD-ROM.

BRIEF DESCRIPTION OF THE DRAWINGS

The invention will be described in more detail, by way of example, with reference to the accompanying drawings, in which.

DETAILED DESCRIPTION

Figure 1:
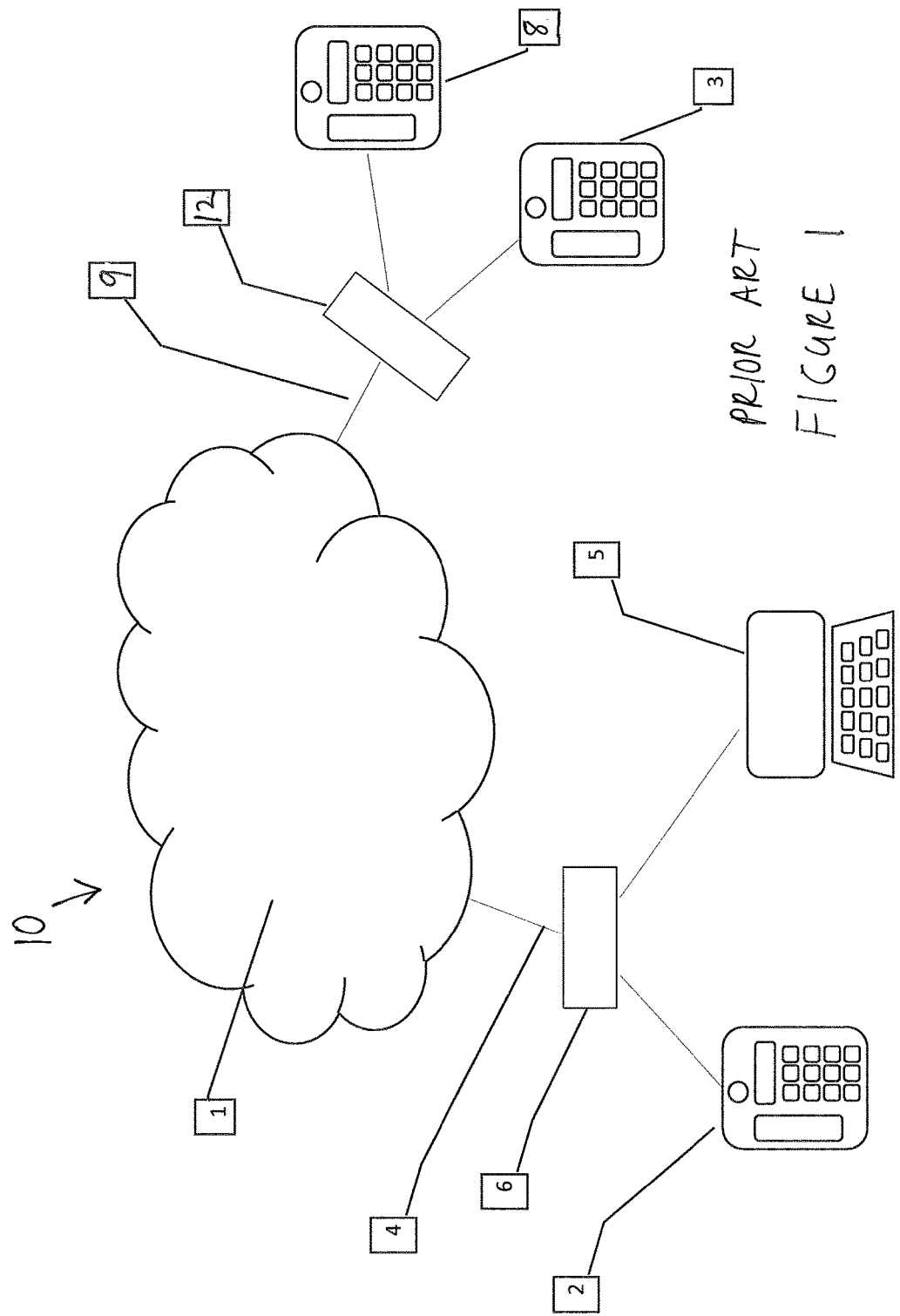
FIG. 1 (prior art) is a schematic diagram of a known telecommunication network.
Figure 2:
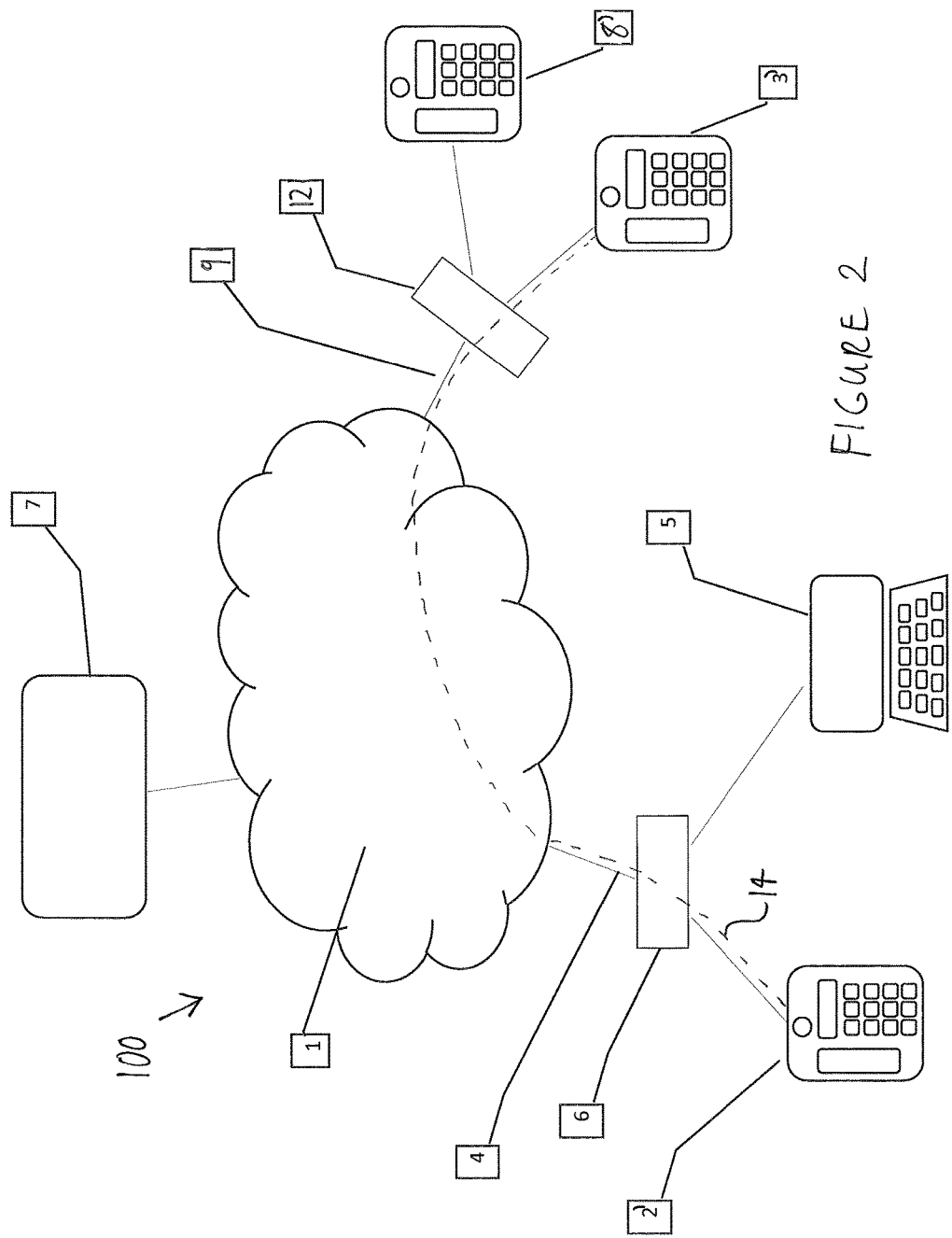
FIG. 2 is a schematic diagram illustrating a telecommunication network embodying an aspect of the present invention.

An example telecommunication network 100 will now be described with reference to FIGS. 2, 3 and 4. The example of FIG. 2 is similar, in many respects, to the prior art telecommunication network illustrated in FIG. 1 and like features have been given like reference numerals. Significantly, the telecommunication network 100 embodying the present invention includes a telecommunication network manager, centralized bandwidth manager (CBM) or shared bandwidth manager 7 for managing the telecommunication network. Broadly, the CBM is a device or distributed device to which media devices send link quality statistics and accept bitrate and forward error correction (FEC) level instructions. Also, while the video phones 2', 3' and 8' of FIG. 2 are similar in most respects to the prior art video phones 2, 3 and 8 of the prior art, they, significantly, also include an input to input an indication, from the telecommunication network manager, of bit rate and FEC rate to use for a media stream along a data path on the telecommunication network.

In more detail, the telecommunication network 100 of FIG. 2 includes media devices or telecommunication end point devices 2', 3' and 8', in this example, they are each a video phone. The video phones may be dedicated hardware devices or implemented in software on a computer such as a desktop computer, laptop computer, tablet or smart phone. The end point devices are each connected to the Internet 1 via a bandwidth-constrained link 4,9 controlled by a router 6,12. Telecommunication end point device 2' is connected to the Internet 1 via the bandwidth-constrained link 4 controlled by the router 6. Telecommunication end point devices 3' and 8' are connected to the Internet 1 via the same bandwidth-constrained link 9 controlled by the router 12. As in the prior art of FIG. 1, a computer, in this example, in the form of a personal computer (PC) or desktop computer 5 is also connected to the Internet 1 via the same bandwidth-constrained link 4 controlled by the same router 6. The PC is a competing device on the network and it will also attempt to send information to the Internet over the same link.

In normal use, a plurality of data paths for media streams are set-up between telecommunication end point devices. That is to say, a call is established between the end point devices or video phones. In this example, for simplicity a single data path 14 for a media stream is illustrated between video phone 2' and another video phone 3'. The data path allows a media stream including packetized, encoded, digital audio and video data to be transmitted between the video phones. The media stream is encoded using forward error correction (FEC) and is established at a particular data rate or bit rate.

In the FEC technique, a message or data is encoded in a redundant way by using an error-correcting code. The redundancy allows a receiver of the data to detect a limited number of errors that may occur anywhere in the message and to correct these errors. The more redundancy that is encoded in the message or data the greater the number of errors that can be corrected at the receiver. The FEC rate is the proportion of a media stream or data stream that is used for error correction. In other words, the proportion of redundant data.

As mentioned above, significantly, the telecommunication network 100 also includes a telecommunication network manager 7 for managing the telecommunication network. The telecommunication network manager is illustrated in more detail in FIG. 3. In this example, the telecommunication network manager is implemented by one or more computers or servers 102 installed with appropriate software or one or more computer programs to implement the method described below. The software may be provided on a computer readable medium or storage device or devices of the computers such as a hard disk drive or solid state memory. Alternatively, the telecommunication network manager may be implemented in dedicated hardware.

Figure 3:
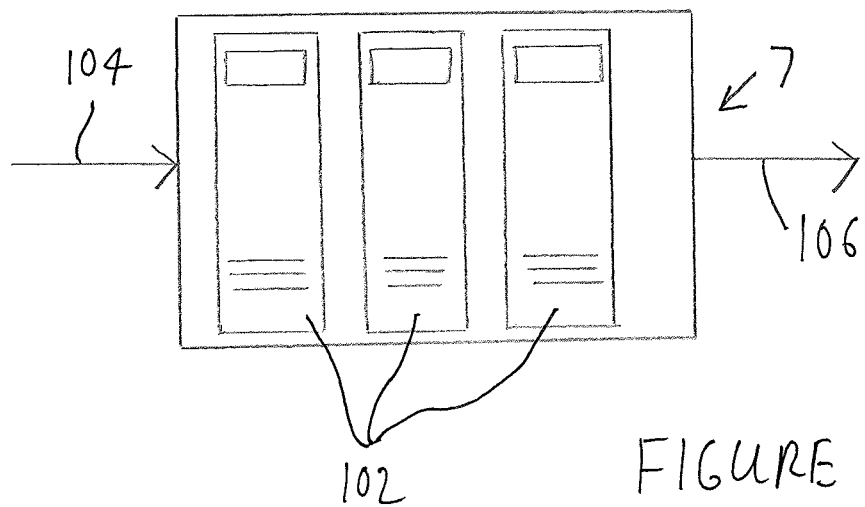
FIG. 3 is a schematic of a telecommunication network manager of the telecommunication network of FIG. 2 embodying an aspect of the present invention.

The example telecommunication network manager 7 of FIG. 3 includes an input 104 to input information regarding at least: a data path 14 along which a media stream travels for telecommunication on the telecommunication network 100, and the media stream. The telecommunication network manager also includes an output 106 to output an indication of bit rate and FEC rate to each of the video phones 2',3' using the data path to use on the data path. The computers 102 of the telecommunication network manager act as a processor to process the information from the input and to output from the output an indication of bit rate and FEC rate to each of the plurality of video phones 2',3' using the data path to use on the data path based on the information.

Figure 4:
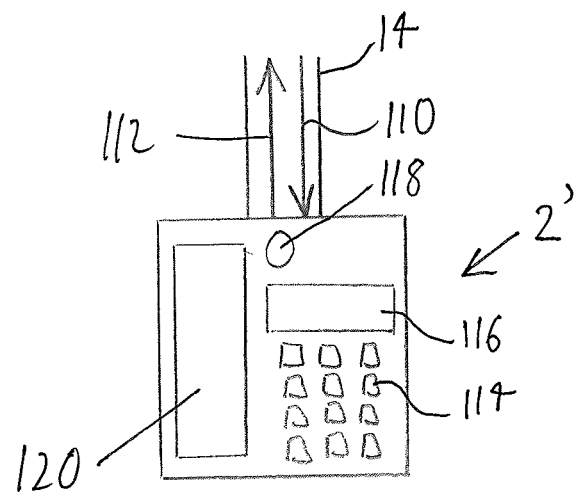
FIG. 4 is a schematic of a telecommunication end point device of the telecommunication network of FIG. 2 embodying an aspect of the present invention.

An example video phone 2' is illustrated in more detail in FIG. 4. It is similar in many respects to a prior art video phone, however, significantly it includes an input 110 to input an indication of bit rate and FEC rate to use for a media stream along the data path 14 from the telecommunication network manager 7 (not shown in FIG. 4). That is to say, it receives instructions from an outside source as to the bit rate or data rate at which to transmit a media stream. It also receives instructions from an outside source as to the FEC rate or error correction methodology with which to transmit a media stream. The video phone 2' includes an output 112 to output the media stream along the data path at the indicated bit rate and FEC rate. In other respects, the video phone is like a prior art video phone. It includes a keypad 114 for entering a telephone number and other information to establish a call with another video phone or phones. It has a display 116, such as a liquid crystal display (LCD), to display video transmitted along the data path in the media stream from another video phone as well as information regarding the video phone itself such as a number that has been dialled. The video phone also has a camera 118 to video a user of the phone and to generate video data to transmit along the data path. The video phone also has a handset 120 including a microphone and a loudspeaker to obtain and output to audio information transmitted in the media stream along the data path.

In use, a user enters a phone number on a video phone 2' (using the keypad 114) of the video phone 3' he or she wishes to call. A data path 14 comprising a plurality of connections between the video phones 2',3' is then established in the normal way. When every connection is established from a media endpoint or video phone, the CBM 7 is informed of the connection attempt either by the call establishing media endpoint 2' or by a call control system (not shown in the Figures). The CBM is given information about the data path that the media stream is going to take. This may include private and public Internet Protocol (IP) addresses of both endpoints, and addresses of any intermediate relay systems.

The CBM 7 considers the media path or data path and provides an initial bitrate and FEC rate for the data path for the call.

As the call proceeds, the endpoints 2',3' periodically send statistics or information about the streams to the CBM 7. This includes, for example, any of: the current transmit bitrate along the data path, the received bitrate at the video phone end points, the packet loss rate along the data path, the packet loss characteristics along the data path, and the latency along the data path. The packet loss characteristics may include a breakdown of the amount of consecutive and random packet loss and variation of this over the period of statistical sampling.

The CBM 7 receives the statistics notifications from all endpoints 2',3' currently in calls at the CBM input 104 and the processor 102 makes decisions or processes the information about bandwidth optimisation, either for individual calls or for groups of calls sharing the same network infrastructure or data path 14.

As a result of this processing, the CBM 7 may instruct or recommend to an endpoint 2',3' that it modify its transmission bit rate and/or its FEC rate to compensate for changing network conditions. This is achieved by appropriate electrical signals being output from the output 106 of the CBM to the input 110 of the video phones 2',3'.

An endpoint 2',3' or the call control system may choose to decline a rate modification if, for example, higher-level semantic rules dictate that the call transmission quality should not be reduced.

If an endpoint 2',3' or the call control system declines a rate modification (bit rate and/or FEC rate) by outputting and transmitting an appropriate electrical signal to the input 104 of the CBM, for example, for an important call, then the CBM 7, using its processor 102, may choose to recommend rate changes on other endpoints using the same network infrastructure to mitigate against packet loss for the more important call. Again, this is achieved by appropriate electrical signals being output from the output 106 of the CBM to the input 110 of the relevant video phones 8'.

The CBM 7 includes a store or memory to keep a historic record of achievable bit rates over time both for each endpoint 2',3',8' and for each pair of endpoints that have had established calls and for data path segments. In other words, the store stores at least some of the information and the indications of bit rate and forward error correction rate output to each of the plurality of end point devices using the data path.

Using this historic record, the processor 102 of the CBM 7 can use algorithms, for example involving heuristics, to build up a network map of interconnected systems and the achievable bit rates along the links in that map. This information is then utilised during initial connection or data path set-up, along with the information about currently active calls and error rates, to make a good prediction of an initial bit rate.

The CBM 7 may choose to require the endsystems 2',3' to stagger their periodic reporting. In other words, information regarding the media stream may be input at the input 104 of the CBM 7 at different times from different end point devices using the data path 14. For example, each endsystem may send statistics every five seconds, but if five calls are up or established and the endsystems stagger the periodic reporting such that an error report is sent from one of the endsystems every second, the CBM would get an indication of a change in error rate within a second.

The CBM 7 may instruct the endsystem 2',3' by outputting from output 106, using an appropriate electrical signal, instructions to reset the statistical sampling period at the same time as changing the bitrate, such that the new statistics include only the new bitrate effects and not the old bitrate effects.

The endsystems 2',3' may incorporate error thresholds such that they will immediately report to the CBM 7 if there is a sudden change in packet loss rate or latency. That is to say, the end point devices 2',3' may each include a store or memory to store packet loss rate and latency along the data path 14. The end point devices 2',3' may output an indication of sudden change in either the packet loss rate or the latency along the data path if the packet loss rate or latency changes by a predetermined amount over a predetermined time period. In order to achieve this, the telecommunication end point device or video phone includes a processor that calculates packet loss rate and/or latency of an input media stream received at the input of the video phone. This calculated packet loss rate and/or latency is output to and input into the CBM 7. The CBM processes this data in order to calculate a bit rate and FEC rate to send to the endsystem. Thus, the telecommunication end point device outputs a media stream along the data path at a bit rate and forward error correction rate based on the calculated packet loss rate and/or latency of the input media stream under the instruction or on receipt of appropriate electric signals from the CBM.

If a new call is being initiated, the CBM 7 may instruct or recommend by outputting from output 106, using an appropriate electrical signal, other endpoints 8' utilising the same network infrastructure to lower their bitrates if it predicts that packet loss may occur when the new call is started because of historical experience or configured knowledge.

If a call drops then the CBM 7 may instruct or recommend by outputting from output 106, using an appropriate electrical signal, other endpoints 2',3' utilising the same links to increase their bitrates.

In an alternative telecommunication network to that of FIGS. 2, 3 and 4, instead of, or in addition to the telecommunication network manager or CBM 7 outputting an indication of forward error correction rate to use on the data path based on the input information, it outputs an indication of predicted packet loss rate along the data path based on the input information. Similarly, the telecommunication end point device or video phone 2',3' has an input to input the indication of predicted packet loss rate along the data path (it may in addition also include an input for the FEC rate to use on the data path, as in the arrangement of FIG. 4). The video phone includes a processor that processes the input indication of predicted packet loss rate and, based on this, calculates a FEC rate for a media stream along the data path. It then outputs from the output a media stream along the data path at the input bit rate and calculated FEC rate. Like the example of FIGS. 2, 3 and 4, the video phone of this example, receives instructions from an outside source from which it establishes a bit rate or data rate at which to transmit a media stream (as well as a FEC rate), however, in contrast to the example of FIGS. 2, 3 and 4, the video phone of this example, makes a calculation from or processes the input data in order to define the FEC rate for the output media stream.

In another alternative telecommunication network to that of FIGS. 2, 3 and 4 or to that described above, the telecommunication network manager or CBM 7 neither outputs an indication of forward error correction rate to use on the data path based on the input information nor an indication of predicted packet loss rate along the data path based on the input information. Instead, only a bit rate to use on the data path is output to the telecommunication end point devices. The telecommunication end point device or video phone 2',3' has an input to input the bit rate to use along the data path. The video phone includes a processor that processes the bit rate to use and, based on this, calculates an appropriate FEC rate for a media stream along the data path. It then outputs from the output a media stream along the data path at the bit rate and calculated FEC rate. Like the example of FIGS. 2, 3 and 4, the video phone of this example, receives instructions from an outside source from which it establishes a bit rate or data rate at which to transmit a media stream as well as a FEC rate, however, in contrast to the example of FIGS. 2, 3 and 4, the video phone of this example, makes a calculation from or processes the input data in order to define the FEC rate for the output media stream. This arrangement requires less processing power at the CBM than the other telecommunication network examples, but more at the end point devices.

Embodiments of the present invention have been described. It will be appreciated that variations and modifications may be made to the described embodiments within the scope of the present invention.

The invention claimed is:

1. A telecommunication network manager comprising:
   an input configured to periodically input information regarding at least: a plurality of data paths along which media streams travel for telecommunication on a telecommunication network, and the media streams from a plurality of endpoint devices, the information comprising quality information for the plurality of data paths;
   an output configured to periodically output to each of the plurality of endpoint devices using the data paths along which media streams travel an indication of bit rate to use on the data paths along which media streams travel; and
   a processor configured to process the information from the input and to periodically output from the output to each of the plurality of endpoint devices using the data paths an indication of bit rate to use on the data paths based on the information related to the plurality of endpoint devices, wherein the processor is further configured to:
   identify a first quality information for a first data path of the plurality of data paths, wherein the first quality information comprises at least one of: a current transmit bit rate, a received bit rate, a packet loss rate, a packet loss characteristic, latency, a decline indication to implement a bit rate, or an indication of a failed implementation of a bit rate;
   determine that the first quality information for the first data path exceeds a first threshold indicating reduced network performance for the first data path;
   identify a second data path sharing at least some of the same network infrastructure as the first data path;
   determine a predicted packet loss rate for the second data path based on the first quality information; and
   cause a reduction in bandwidth allocation for the second data path based on the predicted packet loss rate, wherein the reduction in the bandwidth allocation improves overall bandwidth allocation for the network infrastructure by increasing allowable bandwidth for the first data path.

2. A telecommunication network manager according to claim 1, wherein the information regarding the media streams includes one or more of: current transmit bit rate from at least one of the endpoint devices, received bit rate at least one of the endpoint devices, packet loss rate along the data paths, packet loss characteristics along the data paths, latency along the data paths, a decline indication indicating that at least one of the endpoint devices has declined to implement a bit rate as indicated by the telecommunication network manager, a failure indication indicating that at least one of the endpoint devices has failed to implement a bit rate as indicated by the telecommunication network manager.

3. A telecommunication network manager according to claim 1, wherein:
   the output is further configured to outputs to each of the plurality of endpoint devices using the data paths at least one of an indication of forward error correction rate to use on the data paths and an indication of predicted packet loss rate along the data paths; and
   the processor is further configured to:

process the information from the input and to output from the output to each of the plurality of endpoint devices using the data paths the indication of forward error correction rate to use on the data paths and the indication of predicted packet loss rate along the data paths;

determine that the first data path is of higher priority than the second data path; and cause the reduction in bandwidth allocation for the second data path based on the predicted packet loss rate in response to determining that the first data path is of higher priority than the second data path.

4. A telecommunication network manager according to claim 3, wherein the information regarding the media stream includes one or more of: a decline indication indicating that at least one of the endpoint devices has declined to implement a forward error correction rate as indicated by the telecommunication network manager, a failure indication indicating that at least one of the endpoint devices has failed to implement a forward error correction rate as indicated by the telecommunication network manager.

5. A telecommunication network manager according to claim 3, further comprising a store configured to store data comprising the indications of bit rate and forward error correction rate output to each of the plurality of endpoint devices using the data paths to use on the data paths based on the information.

6. A telecommunication network manager according to claim 1, further comprising a store configured to store data comprising at least some of the information.

7. A telecommunication network manager according to claim 5, wherein the processor is configured to additionally process the data stored at initial media stream set-up on the data paths.

8. A telecommunication network manager according to claim 1, wherein information regarding the media stream is input at different times from different endpoint devices using the data paths.

9. A telecommunication network manager according to claim 1, wherein the information regarding the data paths includes one or more of: Internet Protocol addresses of each of the endpoint devices, and Internet Protocol addresses of intermediate relay systems intermediate the endpoint devices.

10. A telecommunication endpoint device for telecommunication on a telecommunication network, the telecommunication endpoint device comprising:

an input configured to periodically input an indication of bit rate to use for a media stream along a first data path of a plurality of data paths on a telecommunication network, wherein the indication of bit rate to use is based on media stream information from a plurality of endpoint devices, the indication comprising quality information for the plurality of data paths; and an output to configured to output a media stream along the first data path at the indicated bit rate, wherein the telecommunication network comprises a processor configured to:

identify a first quality information for the first data path, wherein the first quality information comprises at least one of: a current transmit bit rate, a received bit rate, a packet loss rate, a packet loss characteristic, latency, a decline indication to implement a bit rate, or an indication of a failed implementation of a bit rate;

determine that the first quality information for the first data path exceeds a first threshold indicating reduced network performance for the first data path;

identify a second data path sharing at least some of the same network infrastructure as the first data path;

determine a predicted packet loss rate for the second data path based on the first quality information; and cause a reduction in bandwidth allocation for the second data path based on the predicted packet loss rate, wherein the reduction in the bandwidth allocation improves overall bandwidth allocation for the network infrastructure by increasing allowable bandwidth for the first data path.

11. A telecommunication endpoint device according to claim 10, wherein at least one of an indication of predicted packet loss rate and forward error correction rate to use for a media stream along a data path on a telecommunication network is periodically input at the input.

12. A telecommunication endpoint device according to claim 11, wherein the output is configured to output the media stream with a bit rate at the input indicated bit rate and a forward error correction rate at the input forward error correction rate.

13. A telecommunication endpoint device according to claim 11, wherein the processor is further configured to process the input indication of predicted packet loss rate along the data path to calculate a forward error correction rate for the media stream along the data path.

14. A telecommunication endpoint device according to claim 13, wherein the output is configured to output the media stream is with a bit rate at the input indicated bit rate and a forward error correction rate at the calculated forward error correction rate.

15. A telecommunication endpoint device according to claim 10, wherein the output is further configured to output at least one of: an indication of current transmit bit rate from the output, an indication of received bit rate at the input, an indication of received packet loss rate, an indication of packet loss characteristics, an indication of data path latency, a decline indication indicating that the endpoint device declines to implement the indicated bit rate, and a failure indication indicating that the endpoint device has failed to implement the indicated bit rate.

16. A telecommunication endpoint device according to claim 11, wherein the output is further configured to output at least one of: a decline indication indicating that the endpoint device declines to implement the indicated forward error correction rate, and a failure indication indicating that the endpoint device has failed to implement the indicated forward error correction rate.

17. A telecommunication endpoint device according to claim 10, wherein the telecommunication endpoint device is configured to store at least one of packet loss rate along the data path and latency along the data path.

18. A telecommunication endpoint device according to claim 17, wherein the telecommunication endpoint device is configured to output an indication of sudden change in at least one of: packet loss rate along the data path if the packet loss rate changes by a predetermined amount over a predetermined time period or latency along the data path if the latency changes by a predetermined amount over a predetermined time period.

19. A telecommunication endpoint device according to claim 10, wherein the input is further configured for input of a media stream.

20. A telecommunication endpoint device according to claim 19, wherein the processor is further configured to calculate at least one of packet loss rate and latency of the input media stream.

21. A telecommunication endpoint device according to claim 20, wherein the telecommunication endpoint device is further configured to output a media stream along the data path at a bit rate and forward error correction rate based on at least one of the calculated packet loss rate and latency of the input media stream.

22. A telecommunication network comprising:
a telecommunication network manager configured to manage the telecommunication network comprising a plurality of data paths for media streams between telecommunication endpoint devices;
the telecommunication network manager comprising:
an input configured to periodically input information regarding at least: a plurality of data paths along which media streams travel for telecommunication on a telecommunication network, and the media streams from a plurality of endpoint devices, the information comprising quality information for the plurality of data paths;
an output configured to periodically output to each of the plurality of endpoint devices using the data paths an indication of bit rate to use on the data paths along which the media streams travel; and
a processor configured to process the information from the input and to periodically output from the output to each of the plurality of endpoint devices using the data paths an indication of bit rate to use on the data paths based on the information related to the plurality of endpoint devices, wherein the processor is further configured to:
identify a first quality information for a first data path of the plurality of data paths, wherein the first quality information comprises at least one of: a current transmit bit rate, a received bit rate, a packet loss rate, a packet loss characteristic, latency, a decline indication to implement a bit rate, or an indication of a failed implementation of a bit rate;
determine that the first quality information for the first data path exceeds a first threshold indicating reduced network performance for the first data path;
identify a second data path sharing at least some of the same network infrastructure of the first data path;
determine a predicted packet loss rate for the second data path based on the first quality information; and
cause a reduction in bandwidth allocation for the second data path based on the predicted packet loss rate, wherein the reduction in the bandwidth allocation improves overall bandwidth allocation for the network infrastructure by increasing allowable bandwidth for the first data path; and
the telecommunication endpoint devices each comprising:
an input configured to periodically input an indication of bit rate to use for a media stream along a data path on a telecommunication network; and
an output configured to output a media stream along the data path at the indicated bit rate.

* * * * *